A. J. FAGER & J. W. MILBERY.
AUTOMATICALLY CONTROLLED CABINET FOR PROTECTING MILK.
APPLICATION FILED JUNE 24, 1914.
1,130,384. Patented Mar. 2, 1915.
2 SHEETS—SHEET 1.
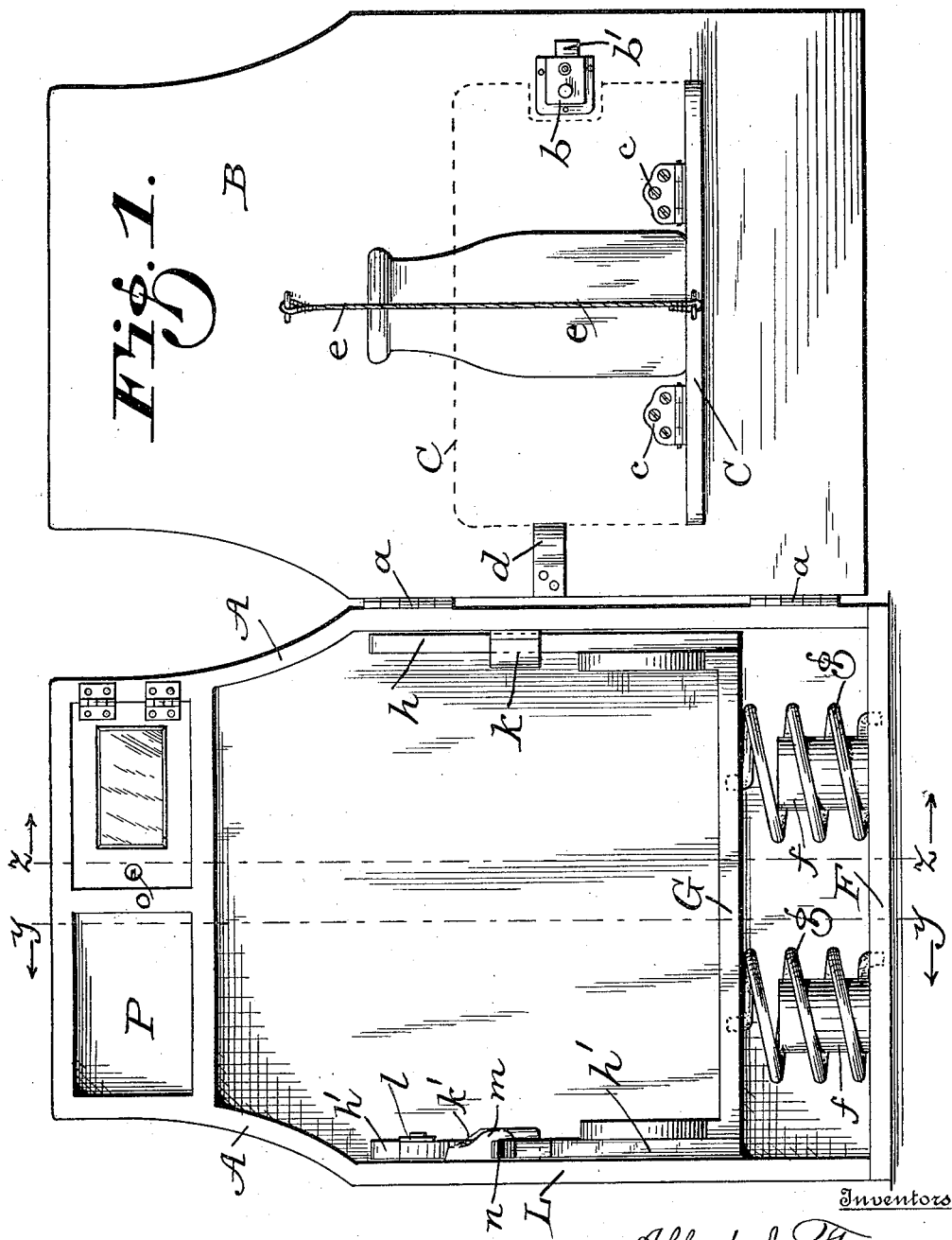
Witnesses
Edward Penrod.
Anna K. Burnham.
Inventors
Alfred J. Fager,
John W. Milbery,
By Frank M. Burnham
Attorney

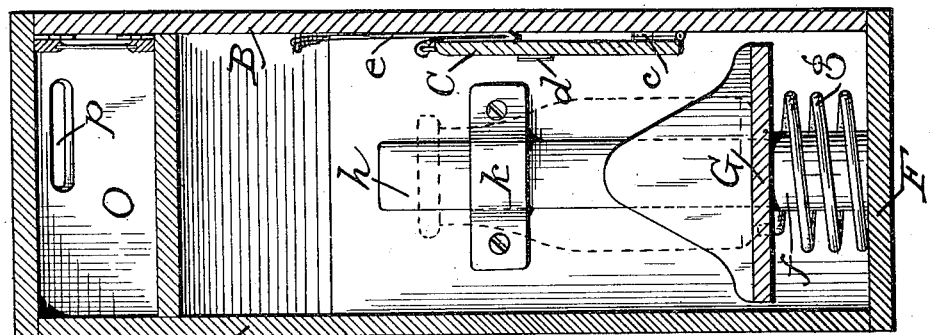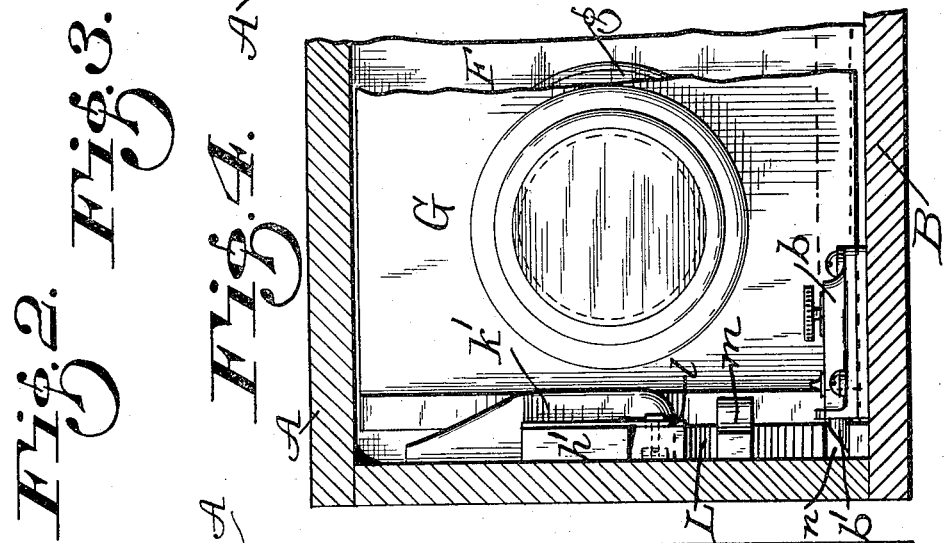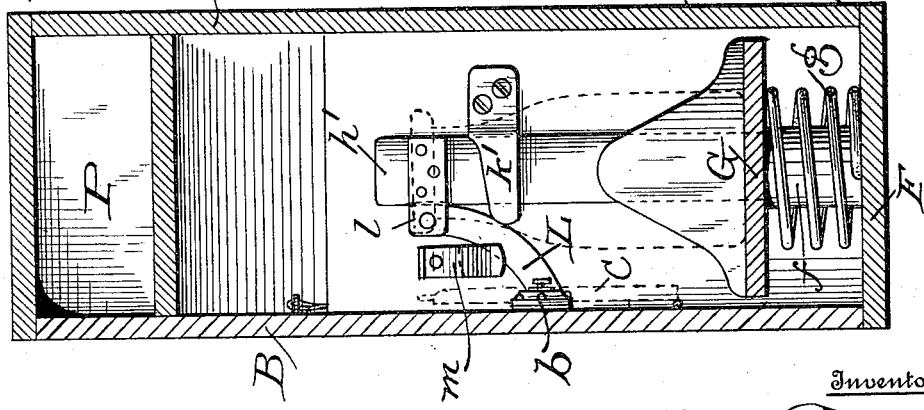

UNITED STATES PATENT OFFICE.

ALFRED J. FAGER AND JOHN W. MILBERY, OF DAYTON, OHIO.

AUTOMATICALLY-CONTROLLED CABINET FOR PROTECTING MILK.

1,130,384.     Specification of Letters Patent.     Patented Mar. 2, 1915.

Application filed June 24, 1914. Serial No. 846,931.

*To all whom it may concern:*

Be it known that we, ALFRED J. FAGER and JOHN W. MILBERY, citizens of the United States, residing at Dayton, in the county of Montgomery and State of Ohio, have invented certain new and useful Improvements in Automatically - Controlled Cabinets for Protecting Milk, of which the following is a specification.

Our invention relates to an "automatically controlled cabinet for protecting milk."

Some of the principal objects of said invention, consist in providing a means or device in the form of a receptacle or cabinet, that can be securely placed in any convenient location; the construction of which is such that it is adapted to receive and hold bottles or jars of milk, protecting same from being stolen, damaged, or tampered with in any manner: and at the same time providing a means for preventing any germs or dirt from settling on and adhering to the caps or covers of said milk bottles, thereby keeping the contents or milk in said bottles at all times perfectly sanitary; clean; pure and free from pollution by said germs or dirt.

Another object, is to also provide in a milk cabinet as above referred to; means whereby any moneys left in payment for milk; as well as any money coming back in change from said payment, will be secured and protected in said cabinet against loss or theft.

Another object, is to provide a means for depositing or leaving of milk at residences, that will avoid and obviate all objectionable knocking at doors or ringing of door bells and the milkman's gong.

Further objects are to provide a milk-cabinet as above referred to, that is very efficient in its results; is simple in construction and composed of few parts; and one which can be manufactured at a small cost and therefore is inexpensive.

This invention consists essentially, referring briefly and in general terms to the structure covering my automatically controlled cabinet for protecting milk; of the very peculiar combination, arrangement and construction of the various parts or mechanical elements which combine to make up the device, and the minor details thereof; all of which will hereinafter be fully and specifically described, and set forth in the subjoined claims all in accordance with the statutes in such cases made and provided therefor.

Referring to the accompanying drawings constituting a formal part of this specification, and illustrating one form of construction for carrying out the objects and principles of our invention and wherein the same reference letters are utilized to indicate and point out the same parts wherever occurring throughout the several views: Figure 1, is a view in front elevation of our cabinet with the door swung entirely open; showing the parts in the interior of the cabinet proper in their normal position. Figs. 2 and 3 are each vertical transverse sectional views of said cabinet taken on dotted lines *y—y*, and *z—z* respectively of Fig. 1; with the door closed and locked and the parts in their operative position: and Fig. 4 is a horizontal transverse sectional view of a broken away portion of the cabinet as shown in Fig. 2, but on an enlarged scale therefrom.

In describing our said invention specifically, and referring in detail to the various mechanical parts or elements of construction which combine to make up our automatically controlled cabinet for protecting milk, as shown throughout the several views of the drawings and pointed out therein by means of the characters of reference aforesaid:—A, refers to the inclosing body or casing of the cabinet,—or cabinet proper; which is preferably in outline of the contour or shape here shown, and to which is connected by any suitable style of hinges *a*, as fully shown in Fig. 1, the door B, which is provided with a spring-lock *b*—having a spring bolt $b^1$,—which is of any preferred construction and style suitable for the purpose intended. A folding shelf C, is connected to the inside face of door B by means of hinges *c*; thus permitting it—when not in service and in its normal position,—to be folded and held up tightly against said door when locked, by means of an ordinary form of spring catch *d* which is fastened to said door by means of its flat end;—as fully and clearly shown in Fig. 1. Said shelf will now be out of the way of the filled bottles of milk locked inside of said cabinet. When shelf C is in service and in its operative position it has the empty bottles placed upon it and is supported at right angles from the inner face of said door by means of a strong cord or chain e,—on the inside of said cabinet just above the movable platform,—which is now empty—and will hereinafter be described; thus adapting it to receive the empty bottles which have been placed upon it, and which are to be removed and taken away by the dairyman or driver of the delivery wagon: said door of course being unlocked and ajar. It will be here observed, that for the purpose of fully and clearly illustrating this important feature of our invention; in Fig. 1 we have shown door B wide open and said shelf in position to support the empty milk bottles, one of which is here shown in solid lines.

Projecting from floor F of the body of said cabinet are supporting stops $f$; encircling which are springs $g$, each having its bearing at the base against said floor and at the top against a movable platform G; the ends of which are provided with arms $h$ and $h^1$. Arm $h$ rests and moves in a guide $k$ extending from one of the ends of the body of said cabinet; while the opposite arm $h^1$—of said movable platform—also rests and moves in a guide $k^1$, connected to this end of the cabinet body; and which it will be observed is slightly different in form from guide $k$ so as to allow for the slight movement of the swinging arm L which is pivotally hinged at its top to an extension $l$ of arm $h^1$ of said platform. Swinging arm L is curved so as to be guided in its movement and is held in proper position as it makes its slight movement with arm $h^1$ of the movable platform, by means of the free end of guide $k^1$, and a finger $m$ connected to this end of the cabinet body; and between which two parts said swinging-arm operates. Said swinging-arm is provided near its end with a notch or recess $n$, adapted to be engaged by spring-bolt $b^1$,—when said notch is brought into alinement with said bolt.

In Fig. 1, and as heretofore referred to, the parts are shown in their normal positions, by reason of the filled milk bottles,—(which are shown by dotted and solid lines in Figs. 2, 3 and 4),—having now been taken or removed from movable platform G,—by the customer or owner of said cabinet;—thus removing all weight from said platform, when springs $g$ will react and expand, throwing said platform and the parts connected thereto and operated by same, from their operative positions as shown in Figs. 2, 3 and 4, slightly upward to the positions shown in Fig. 1, when swinging-arm L will also have moved upward sufficiently until its notch $n$ is now out of alinement with spring-bolt $b^1$ of said spring-lock, and it will now be impossible for door B to be locked;—thus permitting the dairyman or driver to readily open said door. The dairyman or driver of the milk wagon upon his arrival when making his delivery; will now pull open door B and having removed the empty bottle or bottles from folding-shelf C, will fold said shelf up against the door, where it will be again engaged and held by spring-catch $d$ in its normal position. The driver will next take his key,—which is the only key with which he is provided;—and insert it into the lock at $o$ of the door of money compartment O, and having opened the door to said compartment will take therefrom any money placed therein in payment for milk, also any note informing him how many bottles or what amount of milk is desired from the present delivery; said money and note having been placed in said compartment through slotted opening $p$, located in this end of the cabinet body leading to said compartment from the outside. If there is any money coming back to the customer in change from said payment, the driver places this in the open compartment P, and next places the number of bottles holding the required amount of milk desired, on movable platform G, when the weight of said bottles of milk will cause springs $g$ to contract and said platform will move down until it rests on and is supported by supporting-stops $f$, and the parts having now again assumed their operative positions as heretofore fully described, and notch $n$ of the swinging-arm being now in alinement with spring-bolt $b^1$ of said spring-lock; the driver now simply closes door B, when said spring-bolt will enter and engage notch $n$ of swinging arm L, see Fig. 4 and the cabinet will now be closed and locked and the contents therein secured and protected against being stolen, or in fact from any and all intruders; also from the driver who has no key to door B.

It will of course be understood, that when it is desired to open said cabinet so as to remove the filled bottles of milk, also any moneys in change from open compartment P, the key to said cabinet—which is held by the owner thereof,—is placed in the keyhole of said spring-lock which is operated in the usual manner, and door B is opened and the bottles of milk having been removed from movable-platform G also any change from compartment P, and the empty bottles from the previous delivery to be returned are placed on shelf C—which is first placed in its operative and right angle position as shown in Fig. 1,—the parts now being in their normal positions and it being impossible to lock the cabinet door, as heretofore described;—said door is then gently closed and in readiness for the driver on his next delivery.

In practice, said cabinet is intended to be securely connected by several large screws from the inside, to the side of the house, the door frame, or in fact in any suitable manner and location desired.

Said cabinet can be made in any size and style desired, according to the amount of milk and the number of and capacity of the bottles it is desired to hold; although it is preferably intended to hold ½ pint, pint and quart bottles and milk to the amount of 3 quarts. Springs $g$ are to be of just the proper size, strength and resiliency required, to be operated by a ½ pt. bottle of milk, which is the lowest weight that will operate said springs when placed upon said movable platform.

It will here be observed and readily understood, that the construction of our cabinet is such that it has the advantage of being adapted to not alone hold in a sanitary condition and protect from theft as heretofore fully and clearly referred to; milk bottles or jars constructed of glass, but also those constructed out of paper, or in fact any other material.

Having now described our automatically controlled cabinet for protecting milk,—in connection with the illustrations;—as our invention and as new we claim—

1. A cabinet for protecting milk having a door provided with a lock constructed with a spring-bolt; a shelf connected to said door which is adapted to fold up when in its normal position and to extend at right angles therefrom when in its operative position; a spring actuated movable platform having arms held in position by guides connected to the body of the cabinet, from one of said arms there is hung a swinging-arm formed with a notch and adapted to engage the spring-bolt of said lock when said platform moves downward; all substantially in the manner and for the purposes described.

2. The combination in a cabinet for protecting milk, of a door to said cabinet provided with a lock having a spring-bolt, also having a folding shelf connected thereto; a spring actuated platform provided with arms held in position by guides projecting from the body of the cabinet, and adapted when a weight is placed thereon to compress said springs; a swinging-arm pivotally hinged to one of the arms of said platform and formed with a recess adapted to be brought in alinement with the spring-bolt of said lock when said platform has compressed its springs, whereby the spring-bolt of said lock will now engage the recess in said swinging-arm when the cabinet door is closed; substantially as described.

3. The combination in an automatically controlled cabinet for protecting milk,— of an inclosing body to said cabinet; a door to said inclosing body provided with a lock having a projecting bolt; a folding shelf attached to said door; supporting stops and springs projecting from the floor of said inclosing body; a movable platform mounted upon said springs and having arms held in position by means of guides connected to the inclosing body of said cabinet; a swinging-arm pivotally hinged to an extension of one of the arms of said movable-platform and formed with a notch and adapted to be brought in alinement with the bolt of said lock through the action of said platform, so as to receive said bolt, when said door to the cabinet is closed, thereby securely locking said cabinet; substantially in the manner and for the purposes described.

In testimony whereof we affix our signatures in presence of two witnesses.

ALFRED J. FAGER.
JOHN W. MILBERY.

Witnesses:
S. A. Goss,
A. C. McDonald.

Copies of this patent may be obtained for five cents each, by addressing the "Commissioner of Patents, Washington, D. C."